# US009688331B1

United States Patent
Shirai

(10) Patent No.: US 9,688,331 B1
(45) Date of Patent: Jun. 27, 2017

(54) BICYCLE ADJUSTABLE SEAT POST ASSEMBLY

(71) Applicant: Shimano Inc., Sakai, Osaka (JP)

(72) Inventor: Toyoto Shirai, Sakai (JP)

(73) Assignee: Shimano Inc., Osaka (JP)

( * ) Notice: Subject to any disclaimer, the term of this patent is extended or adjusted under 35 U.S.C. 154(b) by 37 days.

(21) Appl. No.: 15/009,823

(22) Filed: Jan. 29, 2016

(51) Int. Cl.
*B62J 1/08* (2006.01)

(52) U.S. Cl.
CPC ............ *B62J 1/08* (2013.01); *B62J 2001/085* (2013.01)

(58) Field of Classification Search
CPC . F16B 7/1463; F16B 7/1427; B62J 2001/085; B62J 1/06; B62J 1/08; B62J 1/10; B62K 19/36
See application file for complete search history.

(56) References Cited

U.S. PATENT DOCUMENTS

| | | | | | |
|---|---|---|---|---|---|
| 390,406 | A | * | 10/1888 | Sittig | A47C 3/26 108/146 |
| 4,807,856 | A | * | 2/1989 | Teckenbrock | B62K 19/36 188/67 |
| 5,740,998 | A | * | 4/1998 | Lindsay | F16M 11/34 248/188.5 |
| 7,967,261 | B2 | * | 6/2011 | Wilcox | F16B 7/1463 248/188.5 |
| 8,328,454 | B2 | | 12/2012 | McAndrews et al. | |
| 8,702,336 | B2 | | 4/2014 | McAndrews et al. | |
| 8,814,109 | B2 | | 8/2014 | Laird et al. | |
| 8,894,025 | B2 | * | 11/2014 | Wehage | B62J 1/06 248/157 |
| 8,926,216 | B2 | | 1/2015 | McAndrews et al. | |
| 9,010,791 | B2 | * | 4/2015 | Frohlicher | B62J 1/08 280/287 |
| 9,073,592 | B2 | * | 7/2015 | Hsu | B62J 1/08 |
| 2007/0215781 | A1 | * | 9/2007 | Watt | A63B 22/0046 248/622 |

FOREIGN PATENT DOCUMENTS

DE         102008059894 A1 *  6/2010  ............... B62J 1/06

* cited by examiner

*Primary Examiner* — Daniel Wiley

(57) ABSTRACT

A bicycle seat post assembly includes first and second tubes, which are telescopically arranged, a fluid chamber, which includes a compressible fluid to generate a force to expand the first and second tubes relative to each other, and a positioning structure. The positioning structure includes a support member on one of the first tube and the second tube, a positioning member that pivots about an axis between a first position and a second position, a control unit, which is connected to the positioning member to move the positioning member between the first position and the second position, and a position maintaining member, which is provided on the other of the first tube and the second tube. The position maintaining member includes an engaging portion that engages with the positioning member to maintain a positional relationship between the first and second tubes.

17 Claims, 8 Drawing Sheets

BICYCLE ADJUSTABLE SEAT POST ASSEMBLY

BACKGROUND OF THE INVENTION

The invention generally relates to bicycle seat posts, and more particularly, to seat posts that are adjustable to vary the height of the seat.

An adjustable seat post allows a cyclist to selectively raise or lower the seat while riding the bicycle. The height of the seat may affect a cyclist's efficiency. For example, it may be advantageous to lower the seat when going downhill. Further, it may be advantageous to raise the seat when climbing a hill. Adjustable seat post assemblies are known in the prior art. However, such seat post assemblies are often difficult to operate.

SUMMARY OF THE INVENTION

In accordance with a first aspect of the invention, a bicycle seat post assembly includes: a first tube; a second tube configured to telescopically move within the first tube in a longitudinal direction; a fluid chamber including a compressible fluid to generate a biasing force to expand the first tube and second tube relative to each other; and a positioning structure. The positioning structure includes: a support member provided on one of the first tube and the second tube; a positioning member configured to pivot about a pivot axis relative to the support member between a first position and a second position; a control unit connected to the positioning member to move the positioning member between the first position and the second position; and a position maintaining member provided on the other of the first tube and the second tube. The position maintaining member includes an engaging portion that engages with the positioning member in a state where the positioning member is pivoted to the first position to maintain a positional relationship between the first tube and the second tube.

In accordance with a second aspect, the positioning member according to the first aspect is located in an internal space of the other of the first tube and second tube, and the first position of the positioning member is radially outward of the second position of the positioning member with respect to a longitudinal center axis of the first tube and the second tube.

In accordance with a third aspect, the bicycle seat post assembly according to the first and second aspects further includes a biasing member configured to bias the positioning member toward the first position.

In accordance with a fourth aspect, the biasing member according to the third aspect is located between the support member and the control unit to bias the control unit toward a distal end of the other of the first tube and the second tube.

In a fifth aspect, the biasing member according to the third and fourth aspects is located about the pivot axis.

In a sixth aspect, the pivot axis according to any of the previous aspects is a first pivot axis, and the positioning member is pivotally connected to the control unit about a second pivot axis.

In a seventh aspect, the control unit according to any of the previous aspects is configured to move relative to the one of the first tube and the second tube in the longitudinal direction.

In an eighth aspect, the positioning member according to any of the previous aspects includes a rolling element configured to rotate relative to a part of the positioning member.

In a ninth aspect, the engaging portion according to the eighth aspect includes a curved recess configured to receive the rolling element of the positioning member.

In a tenth aspect, the position maintaining member of any of the previous aspects is a separate member from the other of the first tube and the second tube.

In an eleventh aspect, the position maintaining member of any of the previous aspects is detachably mounted to an inner peripheral surface of the other of the first tube and the second tube.

In a twelfth aspect, the position maintaining member of any of the previous aspects is a first position maintaining member, and a second position maintaining member is located opposite to the first position maintaining member.

In a thirteenth aspect, the positioning member of any of the previous aspects is a first positioning member, and a second positioning member is provided that is symmetrical with the first positioning member about a longitudinal center axis of the bicycle seat post assembly.

In fourteenth aspect, the fluid chamber of any of the previous aspects is within the other of the first tube and the second tube.

In a fifteenth aspect, an internal section of the one of the first tube and the second tube of any of the previous aspects is configured to communicate with an exterior of the one of the first tube and the second tube.

In a sixteenth aspect, the fluid chamber of any of the previous aspects is located inside one of the first tube and the second tube, and the diameter of the one of the first tube and the second tube is smaller than the diameter of the other of the first tube and the second tube.

In a seventeenth aspect, a ramp is formed in the position maintaining member of any of the ninth to sixteenth aspects to intersect the curved recess, wherein the ramp facilitates escape of the rolling element from the curved recess.

In an eighteenth aspect, the biasing member of any of the second to seventeenth aspects is located about the longitudinal center axis.

In a nineteenth aspect, the invention includes a bicycle seat post assembly including: a first tube; a second tube configured to telescopically move within the first tube in a longitudinal direction; a fluid chamber including a compressible fluid to generate a biasing force to expand the first tube and second tube relative to each other; and a positioning structure. The positioning structure includes: a support member provided on one of the first tube and the second tube; a positioning member configured to move relative to the support member between a first position and a second position; a control unit connected to the positioning member to move the positioning member between the first position and the second position; and a position maintaining member provided on the other of the first tube and the second tube and, wherein the position maintaining member includes an engaging portion that engages with the positioning member in a state where the positioning member is moved to the first position to maintain a positional relationship between the first tube and the second tube. The position maintaining member is a separate member from the other of the first tube and the second tube.

In a twentieth aspect, the position maintaining member of the twentieth aspect is detachably mounted to an inner peripheral surface of the other of the first tube and the second tube.

In a twenty-first aspect, the invention includes a bicycle seat post assembly that includes: a first tube; a second tube configured to telescopically move within the first tube in a longitudinal direction; and a positioning structure. The positioning structure includes: a support member provided on one of the first tube and the second tube; a positioning member configured to move relative to the support member between a first position and a second position; a control unit connected to the positioning member to move the positioning member between the first position and the second position; and a position maintaining member provided on the other of the first tube and the second tube. The position maintaining member includes: an engaging portion that engages with the positioning member in a state where the positioning member is moved to the first position to maintain a positional relationship between the first tube and the second tube; and a fluid chamber including a compressible fluid to generate a biasing force to expand the first tube and second tube relative to each other. The fluid chamber is located within the other of the first tube and the second tube, and an internal section of the one of the first tube and the second tube is configured to communicate with an exterior of the one of the first tube and the second tube.

Other advantages and features of the present invention will become apparent to those skilled in the art from the following detailed description and the drawings.

DESCRIPTION OF THE EMBODIMENTS

Figure 1:
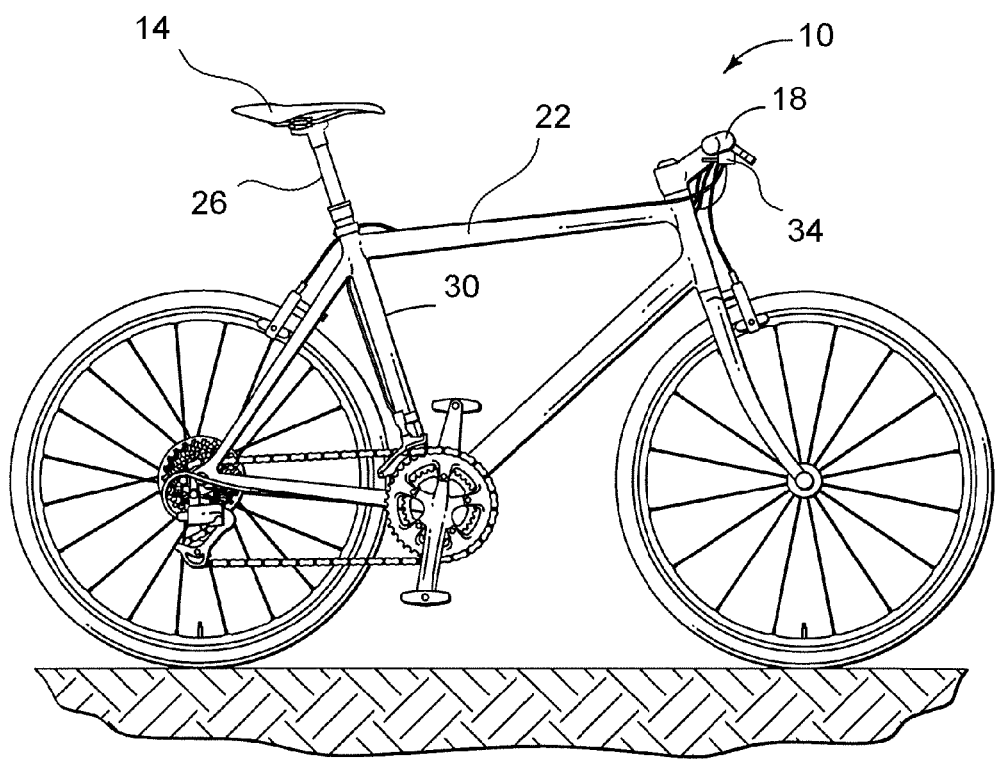
FIG. 1 is a side view of a bicycle including an embodiment of a seat post assembly according to the invention.

FIG. 1 shows a bicycle 10 that includes a seat 14, handlebars 18, a frame 22, and a seat post assembly 26. The seat post assembly 26 is fitted to a seat tube 30 of the frame 22. An operating device 34, which permits the cyclist to control the seat post assembly 26, is located, for example, on the handlebars 18. Other unnumbered parts of the bicycle 10 are well known and will not be discussed or illustrated in detail.

Figure 2:
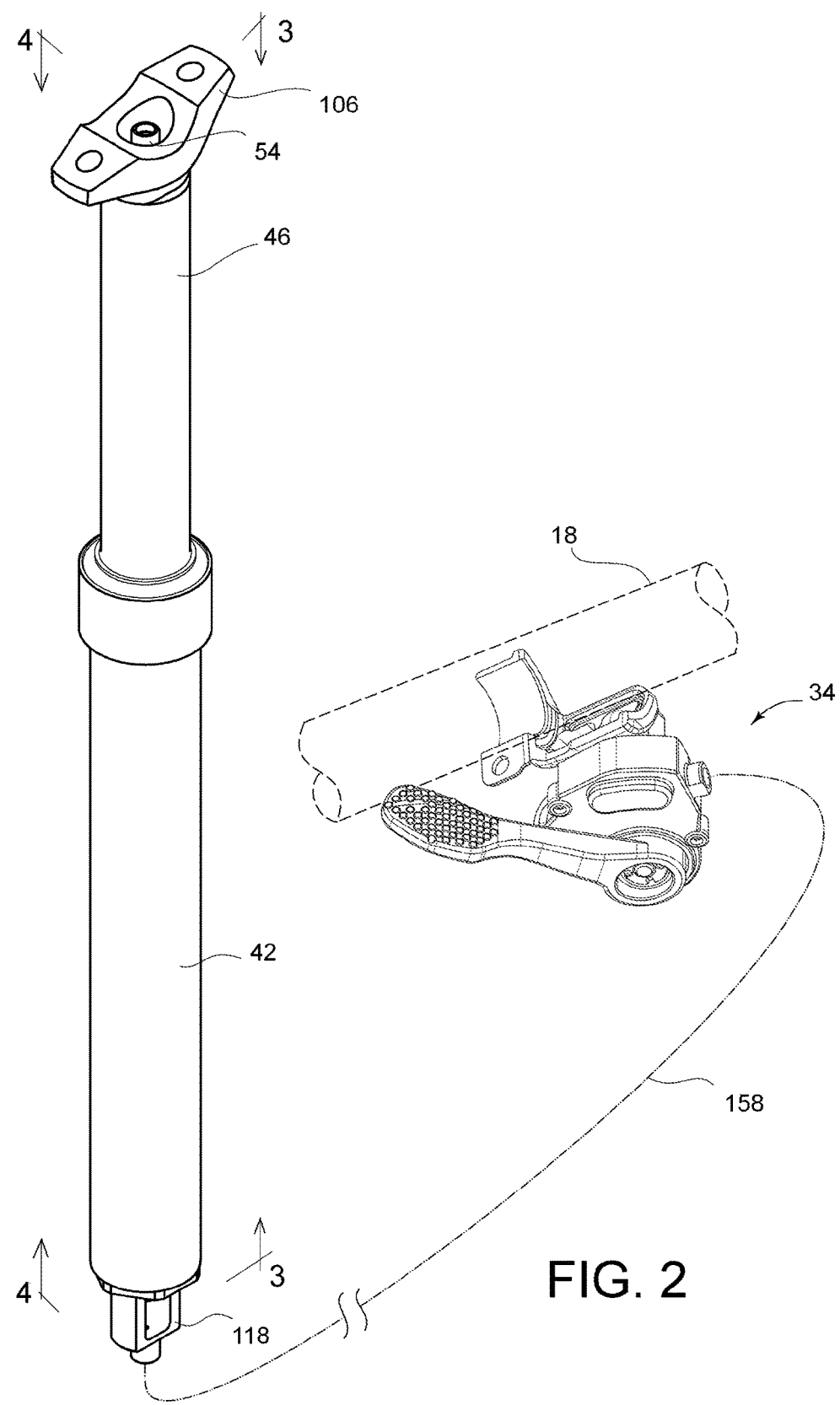
FIG. 2 is a diagrammatic partial perspective view of the seat post assembly of a first embodiment.
Figure 3:
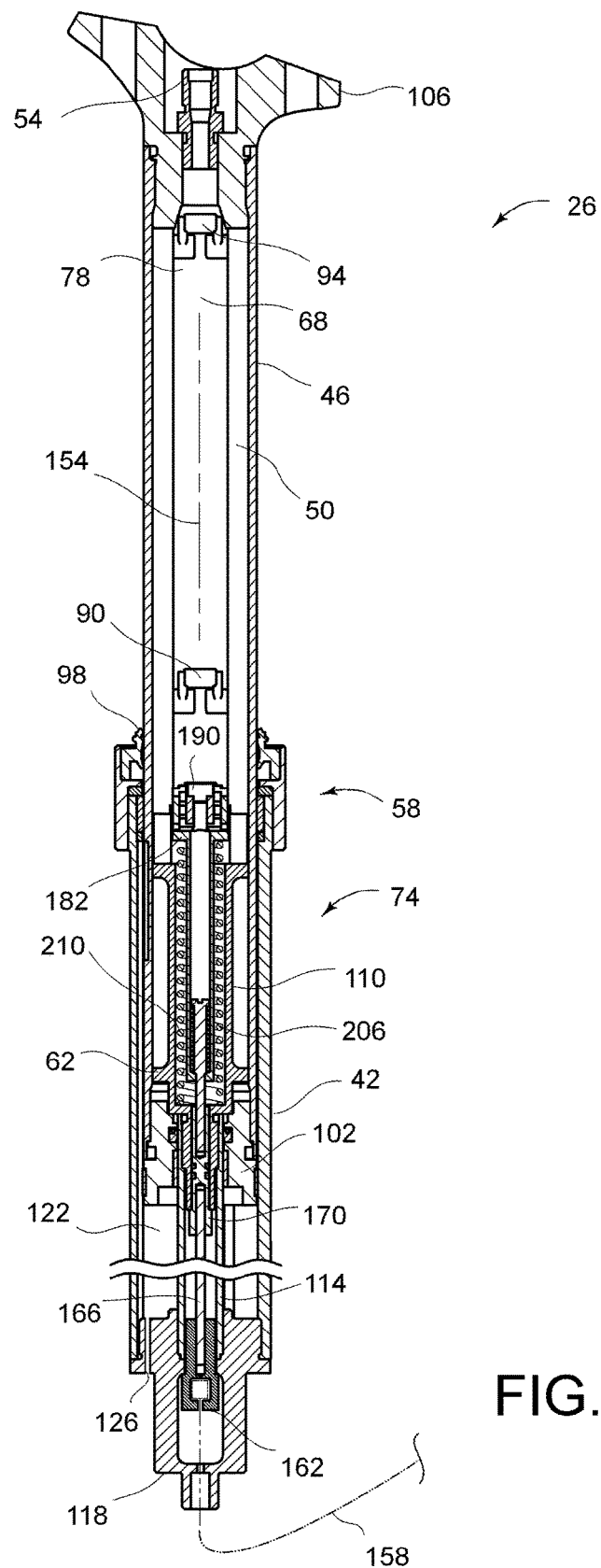
FIG. 3 is a cross-sectional view of the seat post assembly of FIG. 2 taken along plane 3-3 of FIG. 2.

Referring to FIGS. 2 and 3, the bicycle seat post assembly 26 includes a first tube 42 and a second tube 46 configured to telescopically move within the first tube 42 in a longitudinal direction. The telescopic movement between the first tube 42 and the second tube 46 varies the overall length of the bicycle seat post assembly 26 and thus varies the height of the seat 14 when the seat post assembly 26 is installed in the frame 22. In the illustrated embodiments, the first tube 42 is separate from the frame 22 and is installed in the seat tube 30. The first tube 42 and the second tube 46 can be made of one or more materials, such as aluminum, titanium, steel other metals or alloys, carbon fiber, thermoplastics and the like.

Figure 4:
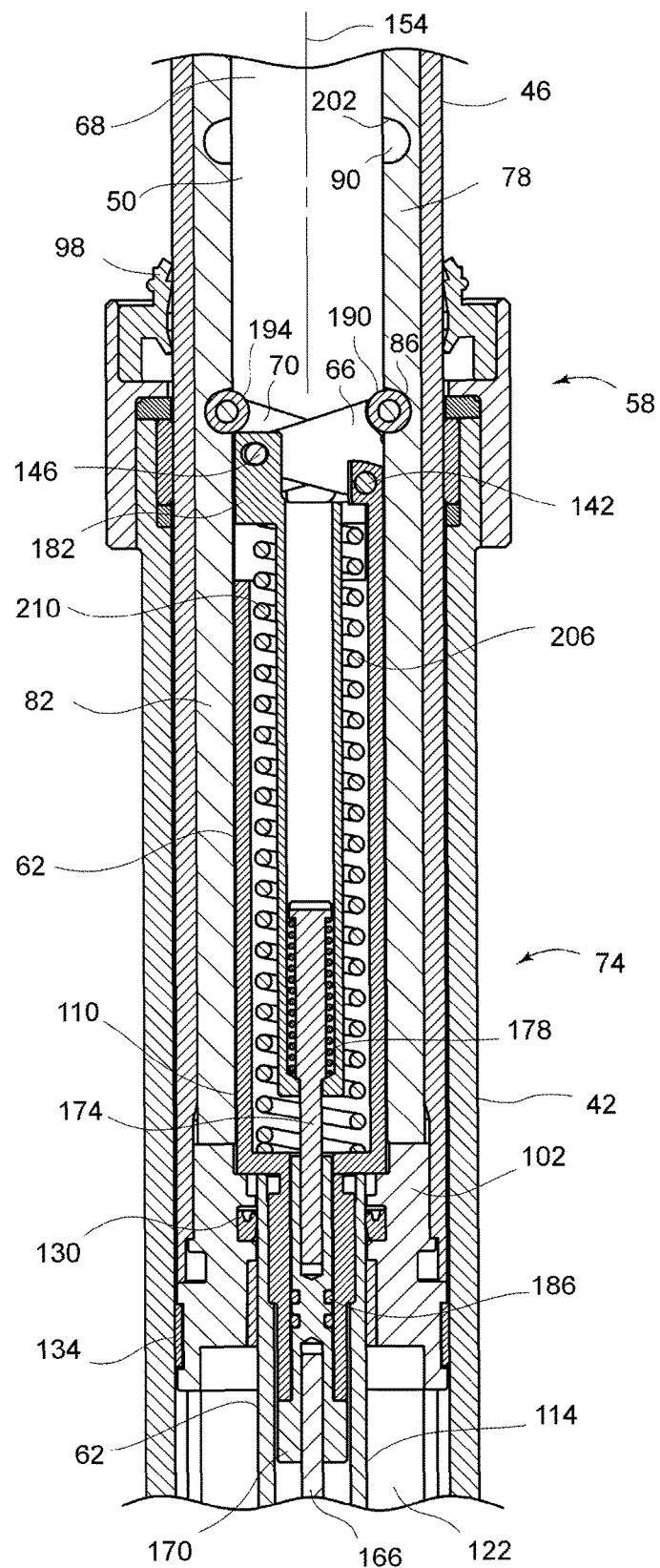
FIG. 4 is a partial enlarged cross-sectional view of the seat post assembly of FIG. 2 taken along plane 4-4 of FIG. 2.

Referring to FIGS. 3 and 4, the bicycle seat post assembly 26 further includes a fluid chamber 50 including a compressible fluid to generate a biasing force to expand the first tube 42 and second tube 46 relative to each other. The fluid chamber 50 is a sealed space within the bicycle seat post assembly 26 that functions as a spring, and the spring force of the fluid chamber 50 is applied in a direction by which the seat post assembly 26 tends to be expanded, or lengthened. For example, in the illustrated embodiments, the fluid chamber 50 is within the second tube 46, as shown in FIG. 3. The volume of the fluid chamber 50 is reduced or enlarged when the first tube 42 and the second tube 46 are moved with respect to one another telescopically. The compressible fluid can be air, for example. A valve 54, such as a Schrader valve, for example, can be provided for adding or removing fluid from the fluid chamber 50. The greater the pressure of the fluid, the greater the force urging the first tube 42 and the second tube 46 in opposite longitudinal directions. Dust seals 98 are provided to prevent dust from entering the first tube 42. Further, various seals and sealing surfaces (unnumbered) are provided to seal the interface between the first tube 42 and the second tube 46 and to seal the fluid chamber 50. Such seals are known in the art and will thus not be described in detail.

In the illustrated embodiments, referring to FIG. 3, the fluid chamber 50 is located, in the axial direction, between a piston 102, which is located at the lower end of the second tube 46, and a seat fixture 106, which closes the upper end of the second tube 46. Referring to FIGS. 3 and 4, when the second tube 46 and the piston 102 move axially, or telescopically, with respect to the first tube 42, the volume of the fluid chamber 50 changes.

Preferably, the fluid chamber 50 is located inside one of the first tube 42 and the second tube 46, and the diameter of the one of the first tube 42 and the second tube 46 is smaller than the diameter of the other of the first tube 42 and the second tube 46. That is, the fluid chamber 50 is preferably located in the smaller one of the first tube 42 and the second tube 46 in diameter. It is preferred to locate the fluid chamber 50 in the smaller-diameter tube so that the fluid chamber 50 produces desirable spring characteristics. Locating the fluid chamber 50 within the smaller-diameter tube results in the fluid chamber 50 producing a more constant spring force throughout the adjustment range of the seat post assembly 26. In other words, locating the fluid chamber 50 within the smaller one of the first tube 42 and the second tube 46 in diameter reduces the difference between the largest and the smallest spring forces produced by the fluid chamber 50 as the fluid in the fluid chamber 50 is compressed throughout the range of movement of the seat post assembly 26. In this embodiment, the fluid chamber 50 is provided between the piston 102 and the seat fixture 106 within the second tube 46. An internal section 122 of the first tube 42 is communicated with an exterior of the first tube 42. Therefore, in this embodiment, only the fluid chamber 50 provides the biasing force to expand the seat post assembly telescopically.

Referring to FIGS. 3-8, the bicycle seat post assembly 26 further includes a positioning structure 58. The positioning structure 58 selectively locks the first tube 42 with respect to the second tube 46, so that the seat 14 is in a fixed position when not being adjusted in the longitudinal direction. However, the positioning structure 58 permits relative telescopic movement between the first tube 42 and the second tube 46 in an adjustment mode, which is discussed in detail below.

The positioning structure 58 includes a support member 62 provided on one of the first tube 42 and the second tube 46. In the illustrated embodiments, the support member 62 is provided on the first tube 42. However, in a reversal of parts, the support member 62 can be provided on the second tube 46. Referring to FIGS. 3 and 4, the support member 62 can include, for example, a sleeve 110, a support shaft 114 and an end cap 118. In the illustrated embodiments, the upper end of the support shaft 114 is fixed to the lower end of the sleeve 110. The lower end of the support shaft 114 is fixed to the end cap 118. Thus, the sleeve 110 and the support shaft 114 are firmly fixed to the first tube 42.

Preferably, the fluid chamber 50 is within the other of the first tube 42 and the second tube 46. That is, the fluid chamber 50 is preferably within the one of the first tube 42 and the second tube 46 on which the support member 62 is not mounted. For example, in the illustrated embodiments, the fluid chamber 50 is within the second tube 46, as shown in FIGS. 3 and 4.

The internal section 122 of the one of the first tube 42 and the second tube 46 is configured to communicate with an exterior of the one of the first tube 42 and the second tube 46. That is, the internal section 122 is in the one of the first tube 42 and the second tube 46 on which the support member 62 is mounted. In the illustrated embodiments, referring to FIG. 3, the internal section 122 is located in the first tube 42 between the piston 102 and the end cap 118. In the illustrated embodiment, a vent 126 is formed in, for example, the end cap 118, which is located at the outer end of the first tube 42, to communicate the internal section 122 with the exterior of the seat post assembly 26. By venting the internal section 122 to the exterior of the first tube 42 (to the atmosphere), the internal section 122 does not apply a spring force to the second tube 46.

Referring to FIGS. 3 and 4, when the seat 14 is being adjusted and the second tube 46 moves in the downward direction, the piston 102 moves with the second tube 46 relative to the first tube 42 and the support shaft 114. The piston 102 includes an inner seal 130, which forms a seal between the piston 102 and the support shaft 114, and a bushing 134, which is provided to reduce a friction between the piston 102 and an inner peripheral surface of the first tube 42. Along with other sealing surfaces, the inner seal 130 prevents fluid from leaking from the fluid chamber 50 into the internal section 122.

Referring to FIGS. 4-8, the positioning structure 58 further includes a positioning member 66 configured to move relative to the support member 62 between a first position and a second position. Various mechanisms can be employed to move the positioning member 66 between the first position and the second position. However, it is preferred that a mechanism be employed that can move the positioning member 66 such that no resistance to the telescopic movement of the first tube 42 and the second tube 46 is created when the height of the seat 14 is being adjusted. For example, referring to the illustrated embodiment of FIGS. 5-7, in which the positioning member 66 pivots, the positioning structure 58 further includes the positioning member 66, which is configured to pivot about a pivot axis 138 relative to the support member 62 between the first position and the second position. The pivot axis 138 is defined by a pivot pin 142, which, in the illustrated embodiments, is supported by an upper end of the support member 62. Thus, the pivot axis 138 is fixed with respect to the first tube 42, since the support member is stationary with respect to the first tube. In the illustrated embodiment, the pivot axis 138 extends perpendicularly to the longitudinal center axis 154.

Figure 6:
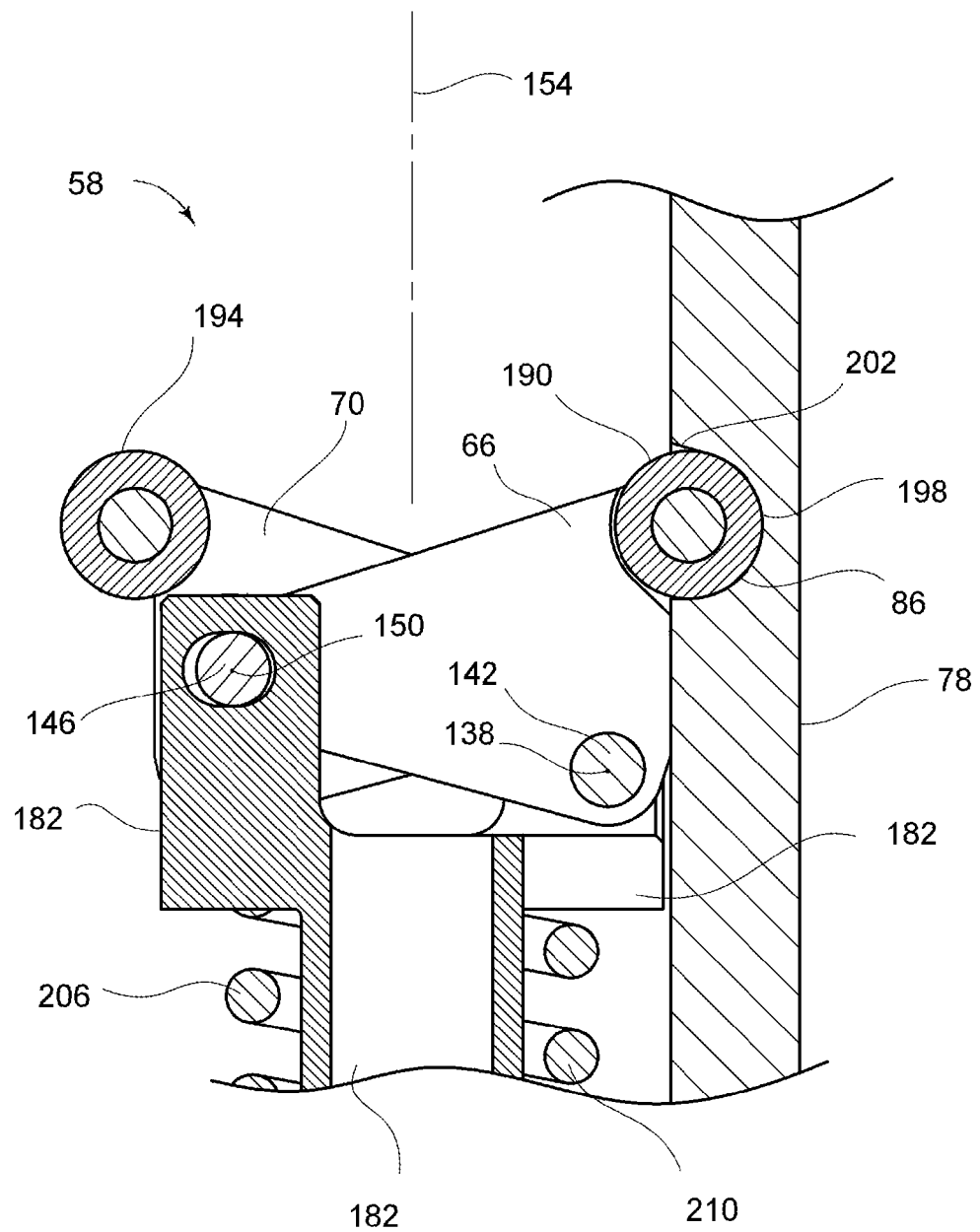
FIG. 6 is a partial diagrammatic cross sectional view of the seat post assembly with parts removed for visibility.
Figure 7:
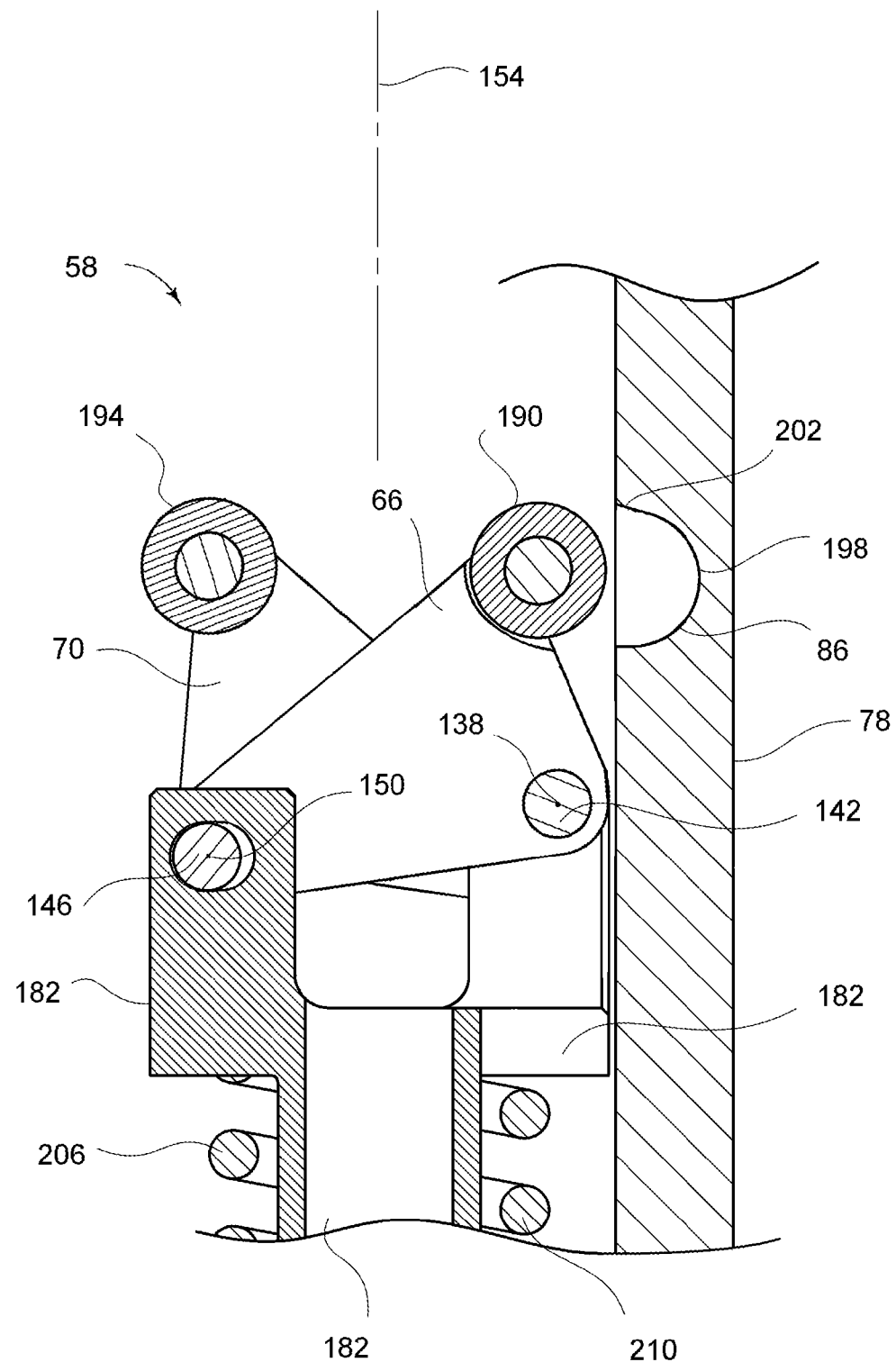
FIG. 7 is a partial diagrammatic cross sectional view of the seat post assembly like FIG. 6.

The positioning member 66 is located in an internal space 68 of the other of the first tube 42 and second tube 46, and the first position of the positioning member 66 is radially outward of the second position of the positioning member 66 with respect to a longitudinal center axis 154 of the first tube 42 and the second tube 46. That is, the positioning member 66 is preferably located in the internal space 68 of the one of the first tube 42 and the second tube 46 on which the support member 62 is not mounted. For example, as shown in FIG. 3, in the illustrated embodiments, the positioning member 66 is located in the internal space 68 of the second tube 46. In the illustrated embodiments, the first position of the positioning member 66 is shown in FIG. 6, and the second position of the positioning member 66 is shown in FIG. 7. In the second position of FIG. 7, the positioning member 66 is completely disengaged with a position maintaining member 78 (described below) to avoid resistance to telescoping movement of the second tube 46. This minimizes resistance to longitudinal movement of the seat post assembly 26 when the seat 14 is being adjusted.

The positioning structure 58 further includes a control unit 74 connected to the positioning member 66 to move the positioning member 66 between the first position and the second position. The control unit 74 is configured to move relative to the one of the first tube 42 and the second tube 46 in the longitudinal direction. That is, the control unit is configured to move relative to the one of the first tube and the second tube on which the support member is mounted. For example, in the illustrated embodiment, a cable 158 applies a longitudinal force to the control unit 74, which applies a pivoting force to the positioning member 66 when the cable 158 is pulled by operation of the operating device 34. The control unit 74 can include, for example, a cable lock member 162, a tension rod 166, a rod coupler 170, a spring rod 174, a return spring 178, and an actuator 182. As shown in FIG. 3, one end of the cable 158 is fitted to the cable lock member 162. When tension is applied to the cable 158, the cable lock member 162 is moved in the downward direction of FIGS. 3 and 4, which causes corresponding longitudinal movement of the tension rod 166, the rod coupler 170, and the spring rod 174. The rod coupler 170 can slide axially within the support shaft 114 of the support member 62. However, coupler seals 186 are located between the outer surface of the rod coupler 170 and the inner surface of the support shaft 114 to seal the fluid chamber 50. Referring to FIGS. 3 and 4, when the rod coupler 170 is moved in response to downward movement in the tension rod 166, the spring rod 174 is moved correspondingly to compress the return spring 178 longitudinally. In the illustrated embodiments, the return spring 178 is coaxial with the first tube 42 and the second tube 46 and is located inside the actuator 182 to extend between a lower end of the actuator 182 and an upper end of the spring rod 174. Compression of the return spring 178 applies longitudinal force on the actuator 182 in the downward direction of FIGS. 3 and 4. The actuator 182 is coupled to the positioning member 66 such that longitudinal movement of the actuator 182 is converted to pivotal motion of the positioning member 66 about the pivot axis 138. Referring to FIG. 4, downward movement of the actuator 182 causes the positioning member 66 to pivot counterclockwise.

The return spring 178 serves to prevent slack in the cable 158. In other words, the return spring can return a lever of the operating device 34 when the rider releases the lever when the seat 14 is being adjusted. However, the return spring 178 is not required. In other words, the rod coupler 170 can be fixed directly to the actuator 182, so that movement is transmitted directly from the cable lock member 162 to the actuator 182.

Although the control unit 74 is cable-operated in the illustrated embodiment, other devices can be employed to move the control unit 74, such as a hydraulic actuator or an electric motor. In the illustrated embodiments, the operating device 34, as shown in FIG. 2, is a manually-operated cable puller, but the operating device 34 can be, for example, an electrically-operated cable puller or a hydraulic operating device. Further, for example, the operating device 34 can be an electrical switch that transmits signals wirelessly or via electrical cable to the electric motor that operates the control unit 74.

Figure 5:
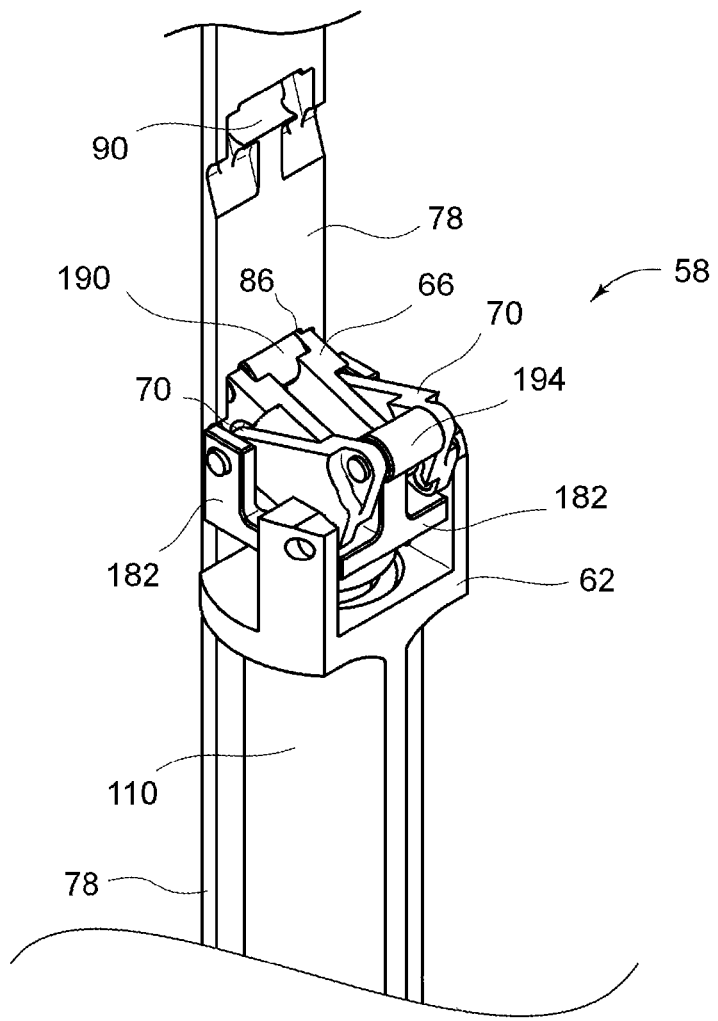
FIG. 5 is a partial perspective view of the seat post assembly of FIG. 2 with parts removed for visibility.

The positioning structure 58 further includes a position maintaining member 78 provided on the other of the first tube 42 and the second tube 46. That is, the position maintaining member 78 is on the one of the first tube 42 and the second tube 46 on which the support member 62 is not mounted. In the illustrated embodiment, the position maintaining member 78 is on the second tube 46 as shown in FIG. 5; however, in a reversal of parts, the position maintaining member 78 can be located on the first tube 42.

The position maintaining member 78 includes an engaging portion 86 that engages with the positioning member 66 in a state where the positioning member 66 is moved to the first position to maintain a positional relationship between the first tube 42 and the second tube 46. Referring to the illustrated embodiment of FIGS. 5-7, in which the positioning member 66 pivots, the engaging portion 86 engages with the positioning member 66 in a state where the positioning member 66 is pivoted to the first position to maintain a positional relationship between the first tube 42 and the second tube 46.

The positioning member 66 can have various shapes. For example, in the illustrated embodiments, the positioning member 66 includes a rolling element 190 configured to rotate relative to a part of the positioning member 66. That is, the rolling element 190 can roll along the surface of the engaging portion 86 when the positioning member 66 is being disengaged from the position maintaining member 78. In the illustrated embodiment, a rotational axis of the roller is parallel to the pivot axis 138.

As best shown in FIG. 7, the engaging portion 86 includes a curved recess 198 configured to receive the rolling element 190 of the positioning member 66. However, an engaging portion 86 with another shape can be employed. The engaging portion 86 is shaped to receive an outer end of the positioning member 66 to cause the second tube 46 to be positioned with respect to the first tube 42. In other words, engagement between the positioning member 66 and the engaging portion 86 prevents telescopic longitudinal movement between the first tube 42 and the second tube 46. In the illustrated embodiments, the engaging portion 86 is a first engaging portion 86, and there is a second engaging portion 90 and a third engaging portion 94, which are spaced longitudinally from the first engaging portion 86, to provide various fixed seat positions, each having a different height. The number of the engaging portions 86, 90, 94 is variable according to the desired level of adjustability.

Further, in the illustrated embodiments, a ramp 202 is formed in the position maintaining member 78 to intersect the curved recess 198. The ramp facilitates escape of the rolling element 190 from the curved recess 198. The ramp 202 is formed at an upper side of the curved recess 198 as shown. The ramp 202 enlarges the opening of the curved recess 198. The ramp 202 is optional and is not required for the operation of the seat post assembly 26.

In the illustrated embodiment, the position maintaining member 78 is a separate member from the other of the first tube 42 and the second tube 46. That is, the position maintaining member 78 is a separate member from the one of the first tube 42 and the second tube 46 on which the support member 62 is not mounted. For example, with reference to FIG. 4, although the position maintaining member 78 can be integral with the second tube 46, it is advantageous for the position maintaining member 78 to be separate from the second tube 46 because it is more efficient to machine the engaging portion 86 on the position maintaining member 78 before it is installed in the second tube 46. Furthermore, it is easier to provide various height adjustable seatpost assemblies, each having a different height, only by selecting a position maintaining member to be installed from the various position maintaining members, each having different height positions.

Although the position maintaining member 78 can be permanently attached by, for example, welding in the illustrated embodiments, the position maintaining member 78 is detachably mounted to an inner peripheral surface of the other of the first tube 42 and the second tube 46. That is, the position maintaining member 78 can be detachably mounted to the one of the first tube 42 and the second tube 46 on which the support member 62 is not mounted. In the illustrated embodiments, the position maintaining member 78 is detachably mounted to the inner peripheral surface of the second tube 46, as shown in FIG. 4. The position maintaining member 78 can be detachably mounted to the second tube 46 by various types of known removable fasteners such as threaded screws, for example. Thus, positioning maintaining members 78, 82 with different spacing intervals between the engaging portions 86, 90, 94 can be substituted according to the desired level of adjustability.

In the illustrated embodiments, the positioning member 66 is a first positioning member 66, and a second positioning member 70 is provided that is symmetrical with the first positioning member 66 about the longitudinal center axis 154 of the bicycle seat post assembly 26. Like the first positioning member 66, the second positioning member 70 has a second pivot axis (unnumbered), which is different from the first pivot axis 138 of the first positioning member 66. The first positioning member 66 and the second positioning member 70 are operated in the same manner but oppositely. Thus, the control unit 74 is pivotally coupled to both the first positioning member 66 and the second positioning member 70 and causes the first positioning member 66 and the second positioning member 70 to pivot simultaneously but in opposite directions with respect to the longitudinal center axis 154. Thus, with reference to FIG. 4, downward movement of the actuator 182 causes the first positioning member 66 to pivot counterclockwise and causes the second positioning member 70 to pivot clockwise. The rolling element 190 is a first rolling element 190, and the second positioning member 70 includes a second rolling element 194 that operates in the same manner.

In the illustrated embodiments, the position maintaining member 78 is a first position maintaining member 78, and a second position maintaining member 82 is located opposite to the first position maintaining member 78. FIGS. 5-8 show only one of the positioning maintaining members 78, 82 for illustrative purposes; however, in the illustrated embodiments, the first and second position maintaining members 78, 82 are symmetrically located with respect to the longitudinal center axis and correspond to the first and second positioning members 66, 70. In the illustrated embodiments, the engaging portion 86 is located at the same axial positions of both the first and second position maintaining members 78, 82. The second position maintaining member 82 is essentially identical to the first position maintaining member 78 and thus will not be described in detail. Although two positioning members 66, 70 and two position maintaining members 78, 82 are illustrated in FIG. 4, it is sufficient to provide only one positioning member 66 and one corresponding position maintaining member 78.

The bicycle seat post assembly 26 further includes a biasing member 206 configured to bias the positioning member 66 toward the first position. The biasing member 206 is located between the support member 62 and the control unit 74 to bias the control unit 74 toward a distal end of the other of the first tube 42 and the second tube 46. That is, the biasing member 206 biases the control unit 74 toward a distal end of the one of the first tube 42 and the second tube 46 on which the support member 62 is not mounted. In the illustrated embodiment of FIGS. 2-7, the biasing member 206 is located about the longitudinal center axis 154. Referring to FIG. 3, the biasing member can be a coiled spring 210 that is located within the support member 62 and extends between the support member 62 and the actuator 182. As viewed in FIG. 3, the biasing member 206 applies force in the upward direction to the actuator 182, which causes the first positioning member 66 and the second positioning member 70 to pivot outwardly toward the respective position maintaining members 78, 82.

Figure 8:
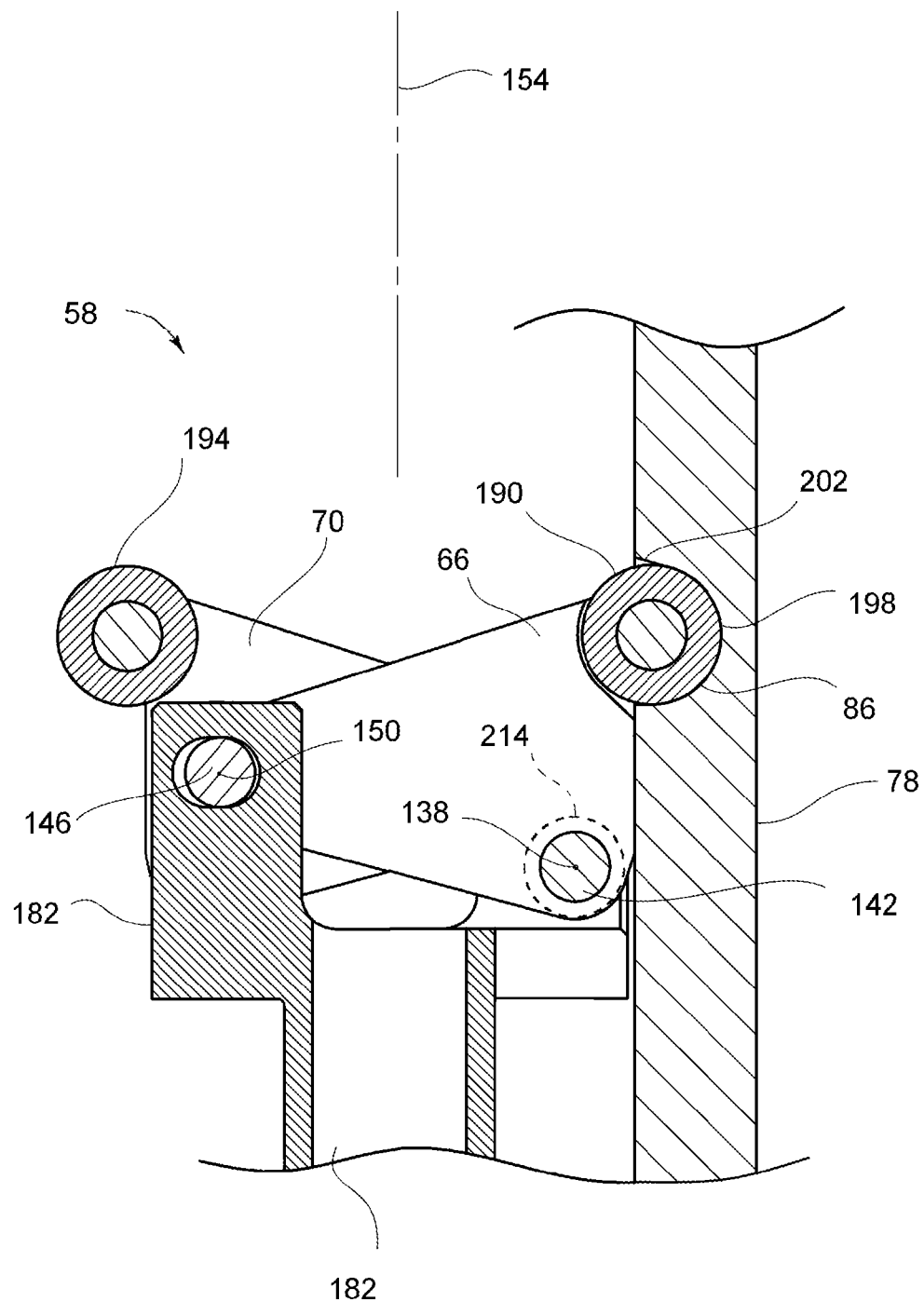
FIG. 8 is a partial diagrammatic cross sectional view of a seat post assembly like FIG. 6 in a further embodiment of the invention.

In an alternate embodiment shown in FIG. 8, the biasing member 206 is located about the pivot axis 138. That is, in the embodiment of FIG. 8, the biasing member 206 is a torsion spring 214 located between the support member 62 and the positioning member 66 to apply an outwardly pivoting force, in a clockwise direction as viewed in FIG. 8, to the positioning member 66. In this embodiment, the biasing member 206 is coaxial with the pivot axis 138, but the biasing member 206 can be located elsewhere as long as the desired pivoting force is applied to the positioning member 66. An identical torsion spring 214 (not shown) is located between the support member 62 and the second positioning member 70 to apply an outwardly pivoting force, in a counterclockwise direction as viewed in FIG. 8, to the second positioning member 70.

In the illustrated embodiments, the actuator 182 is pivotally coupled to the positioning member 66, as shown in FIGS. 4-8. Thus, the pivot pin 142 described above is a first pivot pin 142, and a second pivot pin 146 pivotally couples the actuator 182 to the positioning member 66. The pivot axis 138 is a first pivot axis 138, and the positioning member 66 is pivotally connected to the control unit 74 about a second pivot axis 150. In the illustrated embodiment, the second pivot axis 150 is parallel to the pivot axis 138. However, another mechanical coupling between the actuator 182 and the positioning member 66 can be employed as long as longitudinal movement of the actuator 182 is converted to pivotal movement of the positioning member 66. The second positioning member 70 has second pivot pin (unnumbered) for pivotally coupling the actuator 182 to the second positioning member 70 in a manner like that of the first positioning member 66.

In comparison to some known adjustable seat posts, the seat post assembly 26 of the present invention is easier to operate. The positioning member 66 completely disengages with and separates from the position maintaining member 78 and thus produces no resistance to longitudinal telescopic movement of the seat post assembly 26. In some prior art devices, the positioning member creates resistance even when disengaged, which results in a need for greater spring force to permit telescopic expansion. This makes such devices more difficult to use. In the seat post assembly 26 of the present invention, the spring force produced by the fluid chamber 50 can be reduced, since the positioning structure 58 creates no resistance to movement when disengaged, which makes it easier for the cyclist to adjust the height of the seat 14.

In the illustrated embodiment, the first tube 42 is fixed to the frame 22, the support member 62 is fixed to the first tube 42, and the second tube 46 moves relative to the support member 62 when the seat 14 is adjusted. However, for example, the illustrated arrangement can be inverted such that the second tube 46 is fixed to the seat tube 30 of the frame 22, the seat 14 is fixed to the first tube 42, and the support member 62 is moved relative to the second tube 46 when the seat 14 is adjusted.

The term "detachably attached" or "detachably attaching," as used herein, encompasses configurations in which an element directly attached to another element by directly affixing the element to the other element while the element is detachable from the other element, without damage, and configurations in which the element is indirectly attached to the other element via an intermediate member or members while the element is detachable from the other element and the intermediate member or members, without damage. This concept also applies to words of similar meaning, for example, "detachably joined," "detachably connected," "detachably coupled," "detachably mounted," "detachably bonded," "detachably fixed" and their derivatives.

While the invention has been described in detail with respect to specific embodiments, those skilled in the art, upon attaining an understanding of the specific embodiments, may readily conceive of alterations, variations, and equivalents to these embodiments. Accordingly, the scope of the invention should be assessed as that of the appended claims and their equivalents.

The invention claimed is:

1. A bicycle seat post assembly comprising:
a first tube;
a second tube configured to telescopically move within the first tube in a longitudinal direction;
a fluid chamber including a compressible fluid to generate a biasing force to expand the first tube and second tube relative to each other; and
a positioning structure including:
a support member provided on one of the first tube and the second tube;
a positioning member configured to move relative to the support member between a first position and a second position, wherein in the first position, the positioning member is radially outward of the second position with respect to a longitudinal center axis of the first and second tubes, the positioning member comprising:
a first positioning member pivotable about a first pivot axis, and
a second positioning member pivotable about a second pivot axis which is different from the first pivot axis;
a control unit connected to the positioning member to move the positioning member between the first position and the second position; and
a position maintaining member provided on the other of the first tube and the second tube and, wherein the position maintaining member includes an engaging portion that engages with the positioning member in a state where the positioning member is moved to the first position to maintain a positional relationship between the first tube and the second tube.

2. The bicycle seat post assembly according claim 1, wherein the positioning member is located in an internal space of the other of the first tube and second tube.

3. The bicycle seat post assembly according claim 1, further comprising a biasing member configured to bias the positioning member toward the first position.

4. The bicycle seat post assembly according claim 3, wherein the biasing member is located between the support member and the control unit to bias the control unit toward a distal end of the other of the first tube and the second tube.

5. The bicycle seat post assembly according claim 3, wherein the biasing member is located about the first pivot axis.

6. The bicycle seat post assembly according claim 3, wherein the biasing member is located about the longitudinal center axis.

7. The bicycle seat post assembly according claim 1, wherein the control unit is configured to move relative to the one of the first tube and the second tube in the longitudinal direction.

8. The bicycle seat post assembly according claim 1, wherein the first and second positioning members include a rolling element configured to rotate relative to a part of the respective positioning member.

9. The bicycle seat post assembly according claim 8, wherein the engaging portion includes a curved recess configured to receive the rolling elements of the positioning member.

10. The bicycle seat post assembly according claim 9, wherein a ramp is formed in the position maintaining member to intersect the curved recess, wherein the ramp facilitates escape of the rolling elements from the curved recess.

11. The bicycle seat post assembly according claim 1, wherein the position maintaining member is a separate member from the other of the first tube and the second tube.

12. The bicycle seat post assembly according claim 11, wherein the position maintaining member is detachably mounted to an inner peripheral surface of the other of the first tube and the second tube.

13. The bicycle seat post assembly according claim 12, wherein the position maintaining member is a first position maintaining member, and a second position maintaining member is located opposite to the first position maintaining member.

14. The bicycle seat post assembly according claim 1, wherein the second positioning member is symmetrical with the first positioning member about the longitudinal center axis of the bicycle seat post assembly.

15. The bicycle seat post assembly according claim 1, wherein the fluid chamber is within the other of the first tube and the second tube.

16. The bicycle seat post assembly according claim 15, wherein an internal section of the one of the first tube and the second tube is configured to communicate with an exterior of the one of the first tube and the second tube.

17. The bicycle seat post assembly according claim 16, wherein
the fluid chamber is located inside one of the first tube and the second tube, and
the diameter of the one of the first tube and the second tube is smaller than the diameter of the other of the first tube and the second tube.

* * * * *